Figure 1:
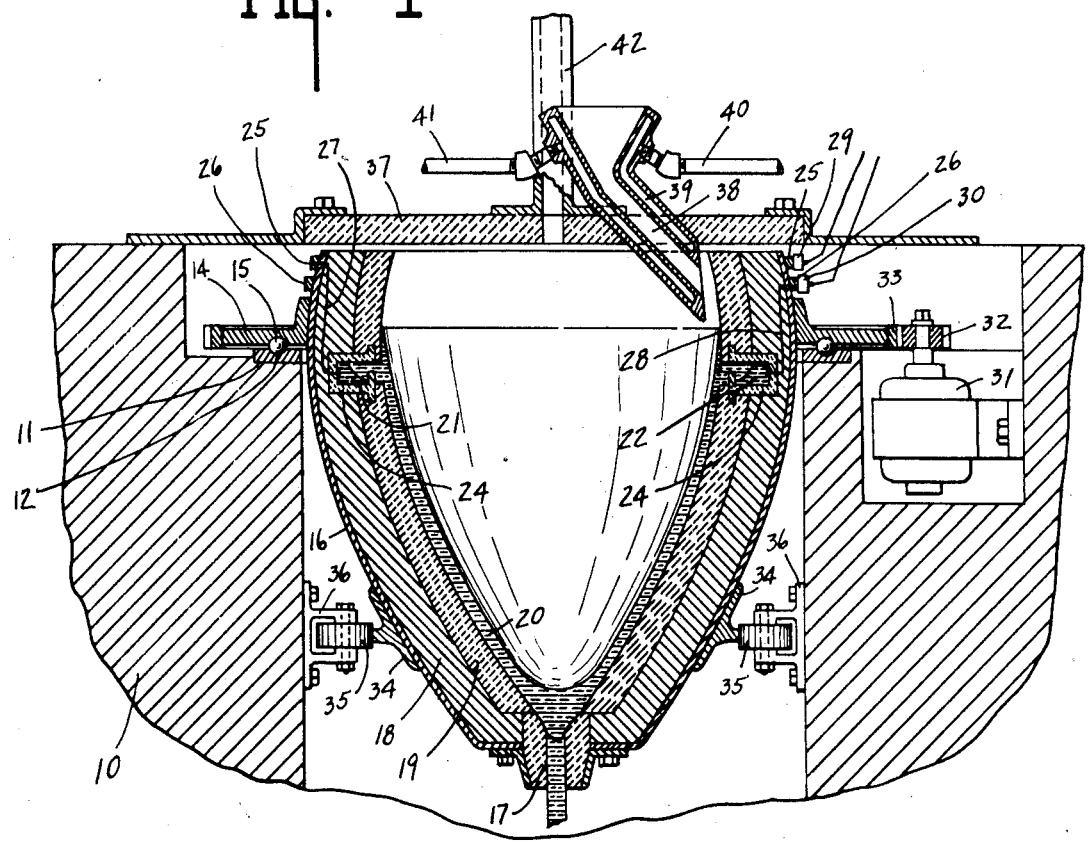

July 9, 1935.　　　　　J. FERGUSON　　　　　2,007,755

PROCESS OF ELECTRICALLY MELTING AND REFINING GLASS AND APPARATUS THEREFOR

Filed July 1, 1933

INVENTOR.
JOHN FERGUSON.

BY Lockwood Lockwood Goldsmith & Galt

ATTORNEYS.

Patented July 9, 1935

2,007,755

UNITED STATES PATENT OFFICE 2,007,755

PROCESS OF ELECTRICALLY MELTING AND REFINING GLASS AND APPARATUS THEREFOR

John Ferguson, Indianapolis, Ind., assignor to Fairmount Glass Works, Indianapolis, Ind., a corporation Application July 1, 1933, Serial No. 678,606

7 Claims. (Cl. 13—6)

This invention relates to a process of melting and refining glass and apparatus therefor, comprising a rotary furnace of the general character set forth and described in my copending application Serial No. 461,163, filed June 14, 1930, entitled Vertical centrifugal glass-melting furnace, and more particularly to an electrically-heated furnace of this character.

The object of this invention is to provide means for electrically heating and melting the glass forming batch discharged into a rotary furnace and maintaining the same in a molten state without the necessity of furnace heating by oil, gas or other fuels developing heat by combustion.

As more specifically set forth in my copending application Serial No. 627,706, filed August 6, 1932, entitled Electric glass melting and refining furnace, molten glass constitutes an electrical conductor having high resistance whereby a current may be passed therethrough and so resisted as to create a high temperature sufficient both to melt the batch and maintain the glass in the desired molten condition. This is accomplished by employing suitable electrodes in the glass tank contacting with the molten glass through which the current is passed, the electrodes comprising preferably molten lead or other suitable material. Thus, this invention embodies the advantages of both the rotary furnace, as distinguished from the stationary furnace, and the electrical heating thereof, as distinguished from the surface heating by fuels.

The rotary furnace has inherent advantages over the stationary furnace which include the rapidity with which gas bubbles or "seeds" are expelled; the rapidity with which the glass may be melted and brought to the desired molten state; the simplicity of the feed from the furnace controlled by the speed of rotation thereof; and perhaps most important of all, the agitation of the molten glass resulting in a more homogeneous mass. Thorough mixing is caused by the "slippage" between different strata of the relatively thin body of the molten glass rotating at high speed, wherein the outer strata rotates at a higher speed than the inner strata due to the inertia of the latter. The resulting homogeneity of the glass discharged from the furnace, coupled with the rapid and complete expulsion of gas bubbles, produces a more refined quality of glass than that available in the usual stationary furnace.

In forms of stationary electrical glass melting furnaces, where molten materials are used to conduct a current into the glass, a limiting condition arises by reason of concentration of the electrical energy and current at the shortest point between the electrodes. This condition perpetuates itself by reason of the fact that the shortest path between electrodes develops the lowest resistance of any path through the furnace. This again results in erosion of the refractory adjacent thereto. On the other hand, in the rotating electric furnace there is no current concentration at any point in the molten electrode by reason of the fact that the corresponding points in the areas of the two electrodes are equal—either in case of a single phase or direct current energy, and also in the multiphase current arrangements. Therefore, there is no tendency for the electrical energy to select any preferred path between the electrodes in relation to the depth of glass covering them.

Figure 2:
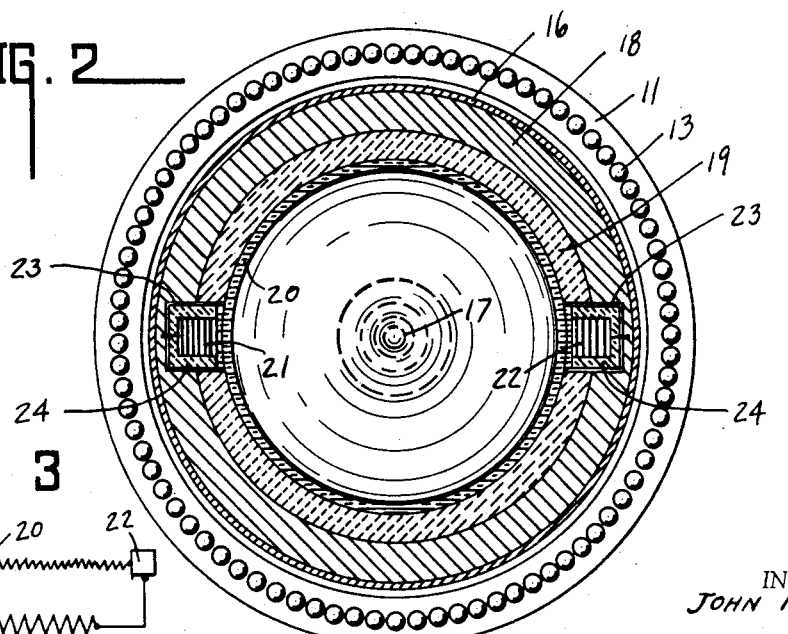
Figure 3:
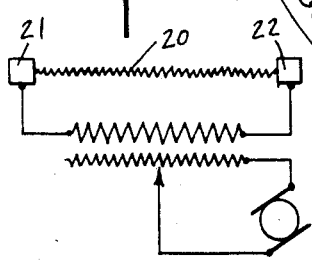

The full nature of the invention will be understood from the accompanying drawing and the following description and claims:

Fig. 1 is a central vertical section through the furnace showing it in operation. Fig. 2 is a horizontal section taken through the bearings and electrodes of the structure illustrated in Fig. 1. Fig. 3 is a diagrammatical illustration of the electric circuit for heating the electrodes.

In the drawing there is illustrated a rotary glass furnace rotatably supported within a well formed within the supporting walls 10 upon which there is provided an annular track 11 serving as a lower ball race provided with a groove 12 in which the balls 13 are adapted to run. The furnace is supported upon the balls 13 by an upper ball race 14 secured about the furnace at its greatest periphery by a ring 15.

The furnace is enclosed within a metal shell 16 tapering to provide a closed bottom having a discharge orifice 17. The shell 16 houses a layer of heat insulating material 18 which in turn encloses a lining of refractory material 19 within which the molten glass 20 is maintained.

At opposite sides of the furnace, approximately at its greatest diameter, there are electrodes 21 and 22. Each of said electrodes comprises pocket partially surrounded by a metal jacket 23 which may be rectangular in shape. The jacket embraces a lining of refractory material 24, and contains a suitable conducting material, such as molten lead or the like. The conducting material sets back in the pocket, but is open to and in engagement with the molten glass 20 so as to have direct contact therewith.

Surrounding the metal shell 16, but insulated therefrom, there is a pair of slip rings 25 and 26, the ring 25 being electrically connected with the electrode 21 through its jacket 23 by a conductor 27. The ring 26 is similarly connected with electrode 22 through a conductor 28. A brush 29 contacts with the ring 25 for causing current to pass therethrough and through the electrode 21 from one side of the circuit, while a brush 30 engages and makes contact with the ring 26 for causing current to pass through the electrode 22 from the other side of the circuit. Thus, an electric current is caused to pass through the molten glass 20 for heating the same to a high temperature during the rapid rotation of the furnace.

Any suitable means for rotating the furnace may be provided, there being indicated herein an electric motor 31 driving a gear 32 which engages with and drives a ring gear 33 formed about the upper ball race 14. For steadying the furnace and centering it during its rotation in conjunction with the ball races there is provided an annular ring 34 adjacent the lower end thereof which rides in a plurality of thrust bearing rollers 35 mounted on brackets 36 about the inner surface of the supporting walls 10.

Mounted over the upper open end of the furnace there is a stationary cover 37 formed of a refractory material, which cover is slightly spaced from the top of the furnace and is supported upon the walls 10, through which there is a feeding trough 38 extending at an angle. The mouth of the trough 38 is directed toward the upper side wall of the furnace and is surrounded by a water jacket 39 coupled with an intake hose 40 and an outlet hose 41. Extending centrally through the stationary cover there is a flue 42 through which gases discharged from the molten glass may pass.

In operation, the cone-shaped furnace is rotated at a high speed by the motor 31, current being caused to pass through the molten glass 20 from one electrode to the other. The molten glass, being a conductor but a high resistor to the current, will be thereby heated to any desired degree of temperature. The temperature at which the molten glass is heated may be substantially higher than the temperatures available for fuel-heated glass. The rapid rotation of the furnace will cause the molten glass to spread in a thin layer about the inner wall thereof and will likewise maintain the molten material of the electrodes 21 and 22 within their pockets. During rotation of the furnace the batch is introduced as required through the feeding trough 38 which will be maintained comparatively cool by the water jacket to permit the free flow of material. As the batch is introduced into the furnace, it will strike the body of molten glass 20 and be spread in a light film about the surface thereof so as to be rapidly melted.

The force of the centrifugal action will rapidly expel gas bubbles to the open interior from which they may escape through the flue 42. The expulsion of the gas is also rendered more rapid by reason of the comparatively thin layer of molten glass surrounding the interior wall of the furnace.

Substantial agitation of the molten glass to produce a more homogeneous mass results from the slippage created between the external and internal surfaces. The rapid rotation of the furnace carrying the outer surface of glass with it, causes a greater speed of rotation thereof than the inner surface which is retarded by the mass inertia.

The discharge of the glass through the orifice after the agitation thereof to bring it to a refined homogeneous mass may be controlled by the speed of rotation of the furnace, increased speed retarding the discharge flow due to centrifugal force, while decreased speed facilitates the discharge. A continuous flow of glass from the furnace into any suitable receptacle or series of molds may be thus controlled.

While this invention has been illustrated herein as embodying slip rings with brush contacts for feeding the current to the respective electrodes, other means of obtaining the same result may be utilized, such as directing the current through the rings 15 and 34 with suitable insulation. The mounting of the furnace and the means for rotating it may also be modified within the scope of this invention.

The invention claimed is:

1. The process of making refined glass, which consists in whirling a thin layer of glass about a vertical axis while in a molten state within the confining wall of a hollow body at sufficient speed to produce a cupping of the free surface of the glass and a production in portions thereof of a bubble-expelling force, and passing an electric current therethrough for maintaining the molten condition of the glass at the required temperature.

2. A rotary glass furnace, comprising a hollow refractory body, means for supplying glass making material through the top thereof, a discharge orifice at the bottom thereof, means for rapidly rotating said body about a vertical axis, a plurality of electrodes mounted about the wall of the furnace with which the molten glass makes contact, and means for causing current to pass through said molten glass from one electrode to another during the rapid rotation of the body.

3. A rotary glass furnace, comprising a hollow refractory body for containing a quantity of molten glass, pockets formed in the side walls of said body open to the molten glass, a current conducting material contained therein in contact with the molten glass, an electrical generating circuit, and means for connecting said circuit with said conducting material during the rotation of the furnace for causing a heating current to pass through the molten glass contained therein.

4. A rotary glass furnace, comprising a hollow conical body, means for rotatably supporting said body in upright position, a discharge orifice at the bottom thereof, means for rapidly rotating said body, electrodes spaced about the upright wall of the body interiorly thereof in electrical contact with the molten glass contained therein, and means for placing said electrodes in a circuit for causing a current to pass through the molten glass to maintain it at a high degree of temperature during the rotation thereof.

5. In a rotating glass furnace comprising a hollow body for containing molten glass, means for supporting said body for vertical rotation, means for rapidly rotating said body for causing the molten glass contained therein to flow about the upright wall, a plurality of pockets in said wall for retaining a molten conducting material to provide an electrode in direct contact with the molten glass, and means for conducting a current to the molten material in each of said pockets.

6. In a rotating glass furnace comprising a hollow body containing molten glass, means for supporting said body for vertical rotation, means for rapidly rotating said body, a plurality of pockets formed about the interior wall thereof and extending substantially radially outward, molten material in each of said pockets for providing an electrode, a metal jacket surrounding each of said pockets, and electrical connections extending from said metal jackets to the exterior of the body for contact with a source of energy whereby current will be caused to pass between the electrodes through the molten glass.

7. In a rotating glass furnace comprising a hollow body having a substantially upright inner wall for containing molten glass, means for supporting said body for vertical rotation, means for rapidly rotating said body, a plurality of pockets spaced about said wall for receiving molten conducting material to provide electrodes, and a lip extending upwardly in each of said pockets to retain said material within the pocket while in a molten condition.

JOHN FERGUSON.